(12) United States Patent  
Graham et al.

(10) Patent No.: US 7,501,009 B2
(45) Date of Patent: Mar. 10, 2009

(54) COMBINED CRYOGENIC DISTILLATION AND PSA FOR ARGON PRODUCTION

(75) Inventors: David Ross Graham, Harleysville, PA (US); Justin David Bukowski, Lenhartsville, PA (US); Jung Soo Choe, Gwynedd Valley, PA (US); Donn Michael Herron, Fogelsville, PA (US); Sang Kook Lee, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 433 days.

(21) Appl. No.: 11/372,954

(22) Filed: Mar. 10, 2006

(65) Prior Publication Data

US 2007/0209508 A1    Sep. 13, 2007

(51) Int. Cl.
*F25J 3/00* (2006.01)
*B01D 53/047* (2006.01)

(52) U.S. Cl. .................... 95/98; 95/138; 96/122; 96/134; 62/648; 62/924; 203/41

(58) Field of Classification Search ............ 96/121, 96/122, 130, 134, 135; 95/95–98, 104, 105, 95/138; 62/600, 615, 640, 643, 648, 924; 203/41
See application file for complete search history.

(56) References Cited

U.S. PATENT DOCUMENTS

| | | | |
|---|---|---|---|
| 4,239,509 A | 12/1980 | Bligh et al. | |
| 4,477,265 A | 10/1984 | Kumar et al. | |
| 4,529,412 A * | 7/1985 | Hayashi et al. | ............ 95/96 |
| 4,732,580 A | 3/1988 | Jain et al. | |
| 4,750,925 A | 6/1988 | MacLean et al. | |
| 4,752,311 A | 6/1988 | MacLean et al. | |
| 4,983,194 A | 1/1991 | Hopkins et al. | |
| 5,100,447 A | 3/1992 | Krishnamurthy et al. | |
| 5,125,934 A | 6/1992 | Krishnamurthy et al. | |
| 5,159,816 A | 11/1992 | Novak et al. | |
| 5,220,797 A * | 6/1993 | Krishnamurthy et al. | ...... 62/620 |
| 5,254,154 A | 10/1993 | Gauthier et al. | |
| 5,313,800 A | 5/1994 | Howard et al. | |
| 5,440,884 A | 8/1995 | Bonaquist et al. | |
| 5,557,951 A | 9/1996 | Prasad et al. | |
| 5,592,833 A | 1/1997 | Moll | |
| 5,601,634 A | 2/1997 | Jain et al. | |
| 5,730,003 A | 3/1998 | Nguyen et al. | |
| 5,738,709 A | 4/1998 | Lee et al. | |
| 5,827,358 A * | 10/1998 | Kulish et al. | ............ 96/115 |
| 6,123,909 A | 9/2000 | Yamamoto et al. | |
| 6,240,744 B1 | 6/2001 | Agrawal et al. | |
| 6,351,971 B1 | 3/2002 | Nguyen et al. | |
| 6,500,235 B2 | 12/2002 | Zhong et al. | |
| 6,527,831 B2 | 3/2003 | Baksh et al. | |

OTHER PUBLICATIONS

Perry, Robert H., et al, Chemical Engineers' Handbook, McGraw-Hill Book Co., 1973, p. 13-3.

\* cited by examiner

*Primary Examiner*—Frank M Lawrence
(74) *Attorney, Agent, or Firm*—Bryan C. Hoke, Jr.

(57) ABSTRACT

A method and apparatus for producing high purity argon by combined cryogenic distillation and adsorption technologies is disclosed. Crude argon from a distillation column or a so-called argon column is passed to a system of adsorption vessels for further purification. Depressurization gas from adsorption is introduced back, in a controlled manner, to the distillation column and/or a compressor or other means for increasing pressure. Particulate filtration and getter purification may optionally be used.

25 Claims, 1 Drawing Sheet

COMBINED CRYOGENIC DISTILLATION AND PSA FOR ARGON PRODUCTION

BACKGROUND OF THE INVENTION

This invention relates to an apparatus and method for production of high purity argon. More specifically, this invention relates to an apparatus and method for improving argon recovery from air using a cryogenic rectification column in combination with a pressure swing adsorber.

A crude argon stream containing about 0.2-15% by volume oxygen and about 1% by volume nitrogen may be recovered in the operation of a cryogenic air separation plant that produces oxygen and/or nitrogen. One of the methods generally employed to further purify the crude argon stream, is the so-called deoxo method, whereby oxygen in the crude argon stream is reacted with excess hydrogen. This process is energy intensive, since the gas stream is heated to a high reaction temperature and later cooled to cryogenic temperatures to remove the excess hydrogen and residual nitrogen. In addition, this process may not be practical in those parts of the world where hydrogen availability is limited. Another method, based on cryogenic distillation only, requires the use of a large or superstaged argon column due to the small difference in the relative volatility between argon and oxygen. Additional methods include the use of solid electrolyte membrane(s), two or more adsorption beds in a vacuum pressure swing adsorption (VPSA) process, getter/deoxo system, and temperature swing adsorption (TSA).

The cryogenic rectification of air to produce oxygen, nitrogen and/or argon is well-known. Typically, a three stage cryogenic process is used, wherein feed air is separated into nitrogen and oxygen in a double column system that uses nitrogen top vapor from a higher pressure column to reboil oxygen-rich bottom liquid in a lower pressure column, and argon-containing fluid from the lower pressure column is passed into a crude argon column for the production of argon product. For example, U.S. Pat. No. 5,440,884 by Bonequist and Lockett, disclosed a three stage cryogenic rectification system, employing a double column system with an associated crude argon column, to produce high purity (>99.999%) argon. In order to produce high purity argon, a large or superstaged argon column was used. According to U.S. Pat. No. 5,440,884, the large crude argon column is preferably divided into two separate argon columns, and a stripping column is used upstream of the double main column to suppress the thermodynamic irreversibility of the crude argon column top condenser and the lower pressure column.

U.S. Pat. No. 4,477,265 to Kumar et al., discloses the adsorption of oxygen and nitrogen from an argon-rich feed taken from the rectification column of a cryogenic air separation plant. According to this patent, argon of high purity is separated and recovered from a crude argon stream containing minor amounts of oxygen and nitrogen, by selective adsorption of these contaminants in a series of adsorption columns (beds). In an embodiment, the system utilizes two separate adsorbent columns in series wherein the first column contains a nitrogen equilibrium selective adsorbent (e.g. zeolite) that is used for nitrogen removal, and the second bed containing an oxygen rate selective adsorbent (e.g. carbon molecular sieve) used for oxygen removal. Further purification of the recovered argon may be carried out by catalytic hydrogenation of residual oxygen therein.

U.S. Pat. No. 6,527,831 to Baksh et al., discloses a vacuum pressure swing adsorption system for purifying argon from a crude argon feed stream utilizing two adsorption beds and continuously promotes the crude argon feed stream to the bed during the process with simultaneous equalization of pressure in the two beds in top-to-top end and bottom-to-bottom end equalizations in each bed following purging of each bed.

U.S. Pat. No. 6,351,971 to Nguyen et al., discloses a process and system for producing a high purity argon product with high argon recovery from an air feed stream utilizing a low ratio argon column, a high ratio argon column and a vacuum pressure swing adsorption unit in combination with a cryogenic air separation plant.

Other patents related to argon production include U.S. Pat. No. 5,730,003 to Nguyen et al., U.S. Pat. No. 5,557,951 to Prasad et al., U.S. Pat. No. 5,601,634 to Jain et al., U.S. Pat. No. 5,159,816 to Kovak et al., U.S. Pat. No. 4,239,509 to Bligh et al.

BRIEF SUMMARY OF THE INVENTION

As can be observed from the art, it would be desirable to provide a system and process for producing product argon with 99.999 mole percent argon with less than 1 ppm oxygen and less than 1 ppm nitrogen. Improvements in the refining of crude argon in a cryogenic air separation system have long been sought. Economic factors, along with more stringent purity specification for argon, increase the need for improved processing to more completely eliminate both oxygen and nitrogen from the argon product.

While argon purity is important, it would also be desirable to recover a greater portion of the argon from cryogenic distillation of air.

It would be desirable to maintain stability of the cryogenic distillation column. It has heretofore been unrecognized that some of the downstream purifying methods may impact the stability of the cryogenic distillation column.

For example, with reference to FIG. 1, argon production may be increased as the argon feed stream 180 from the low pressure column (not shown) to the crude argon column 150 is increased. Feed stream 180 may only be increased to the point where the stream does not contain significant amounts of nitrogen. Nitrogen in feed stream 180 is detrimental to the operation of the crude argon column 150 since nitrogen will accumulate as a vapor in condenser 170. If nitrogen vapor is allowed to accumulate in condenser 170, condenser 170 will cease to function properly, and liquid held up in column 150 may flow back into the low pressure column; so-called "column dumping." On column dumping, oxygen product is contaminated and the column will typically be shut down.

The flow rate of feed stream 180 is selected to provide a balance between argon production and column dumping. To avoid column dumping, the flow rate of feed stream 180 is conventionally kept well below this threshold.

The flow rate of feed stream 180 may be pushed closer to the threshold without column dumping, as long as fluctuations in the system are minimized. For improved argon production, downstream processing, such as argon purification, should provide minimal fluctuations to the system.

For example, any streams returning to the crude argon column 150, such as stream 190, should be steady in order to minimize fluctuations in column 150. Any variation in stream 190 will affect feed stream 180. This is because condenser 170 acts to draw a fixed amount of vapor into column 150 as it turns vapor into liquid. Therefore, variability in stream 190 will cause variability in feed stream 180.

The present invention is intended to provide the above-mentioned benefits while overcoming disadvantages of the prior art.

In an embodiment, the present invention is a method for producing argon product comprising withdrawing an argon-containing fluid from a cryogenic distillation column, increasing the pressure of at least a portion of the argon-containing fluid in a means for increasing pressure thereby forming a compressed argon-containing fluid, introducing at least a portion of the compressed argon-containing fluid into a first end portion of a first pressure swing adsorption vessel, withdrawing a first argon-rich gas from a second end portion of the first pressure swing adsorption vessel. After terminating the introduction of the compressed argon-containing fluid into the first pressure swing adsorption vessel, the method according this embodiment further comprises withdrawing a depressurization gas from at least one of the first end portion and a middle portion of the first pressure swing adsorption vessel thereby reducing the pressure in the first pressure swing adsorption vessel to a final depressurization pressure, regulating the flow of at least a portion of the depressurization gas by passing the at least a portion of the depressurization gas to a means for moderating flow thereby forming a regulated depressurization gas, and introducing at least a portion of the regulated depressurization gas into at least one of the cryogenic distillation column and the means for increasing pressure.

For at least 90% or 95% of the cycle time, the at least a portion of the regulated depressurization gas may have a molar flow rate within 50% and 400%, or within 66% and 200%, of the time-averaged molar flow rate of the at least a portion of the regulated depressurization gas. The final depressurization pressure may be 0 psig to 20 psig.

The argon-containing fluid may comprise greater than 50 volume % argon. The first argon-rich gas may comprise greater than 90 volume % argon. The first argon-rich gas may comprise less than 0.001 volume % oxygen.

The method according to the invention may comprise one or more of the following characteristics, taken alone or in any possible technical combinations.

The means for moderating flow in the present invention may comprise a gas capacitance means and a downstream flow restriction. The gas capacitance means may have a volume that is 0.5 to 20 times the volume of the first pressure swing adsorption vessel.

The compressed argon-containing fluid may comprise oxygen, and the method may further comprise kinetically adsorbing the oxygen in the first pressure swing adsorption vessel using carbon molecular sieve.

The inventive method may further comprise withdrawing a first equalization gas from the middle portion of the first pressure swing adsorption vessel, introducing at least a portion of the first equalization gas into a first end portion of a second pressure swing adsorption vessel, withdrawing a second equalization gas from the second end portion of the first pressure swing adsorption vessel, and introducing at least a portion of the second equalization gas into a second end portion of the second pressure swing adsorption vessel.

The inventive method may further comprise introducing a second argon-rich gas from at least one of the second pressure swing adsorption vessel and a third pressure swing adsorption vessel into the second end portion of the first pressure swing adsorption vessel during at least a portion of the step of withdrawing the depressurization gas.

The inventive method may further comprise filtering at least a portion of the depressurization gas. The inventive method may further comprise filtering at least a portion of the regulated depressurization gas.

The inventive method may further comprise introducing at least a portion of the first argon-rich gas into another cryogenic distillation column. The inventive method may further comprise introducing at least a portion of the first argon-rich gas into a purifier vessel containing a getter.

In an embodiment the present invention is an apparatus for producing argon product comprising a distillation column having an inlet and an outlet, the outlet for withdrawing an argon-containing fluid, a means for increasing pressure of the argon-containing fluid having an inlet and an outlet, the inlet in fluid communication with the distillation column outlet, a first pressure swing adsorption vessel having a first end portion, a middle portion, and a second end portion, the first end portion in selective fluid communication with the outlet of the means for increasing pressure, and a second pressure swing adsorption vessel having a first end portion, a middle portion, and a second end portion, the first end portion of the second pressure swing adsorption vessel in selective fluid communication with the outlet of the means for increasing pressure. The apparatus of the present invention further comprises a means for moderating flow having an inlet and an outlet, the inlet of the means for moderating flow in selective fluid communication with the first end portion of the first pressure swing adsorption vessel and in selective fluid communication with the first end portion of the second pressure swing adsorption vessel, the outlet of the means for moderating flow in fluid communication with at least one of the inlet of the distillation column and the inlet of the means for increasing pressure.

The means for moderating flow may comprise a gas capacitance means and a downstream flow restriction. The downstream flow restriction may comprise at least one flow control valve. The gas capacitance means may have a volume 0.5 to 20 times greater than the volume of the first pressure swing adsorption vessel.

The apparatus according to the invention may comprise one or more of the following characteristics, taken alone or in any possible technical combinations.

The first pressure swing adsorption vessel and the second pressure swing adsorption vessel may contain carbon molecular sieve.

The middle portion of the first pressure swing adsorption vessel may be in selective fluid communication with the first end portion of the second pressure swing adsorption vessel and the second end portion of the first pressure swing adsorption vessel may be in selective fluid communication with the second end portion of the second pressure swing adsorption vessel.

The apparatus according to the present invention may comprise a particulate filter having an inlet and an outlet, the inlet of the particulate filter in fluid communication with the outlet of the means for moderating flow, the outlet in fluid communication with the inlet of the distillation column.

The apparatus according to the present invention may comprise another distillation column having an inlet and an outlet, the inlet of the other distillation column in selective fluid communication with the second end of the first pressure swing adsorption vessel and in selective fluid communication with the second end of the second pressure swing adsorption vessel.

The apparatus according to the present invention may comprise a purifier vessel containing a getter. The purifier vessel may be in selective fluid communication with the outlet of the pressure swing adsorption vessel. The outlet of the purifier outlet may be in fluid communication with the inlet of the other distillation column.

DETAILED DESCRIPTION OF THE INVENTION

Figure 1:
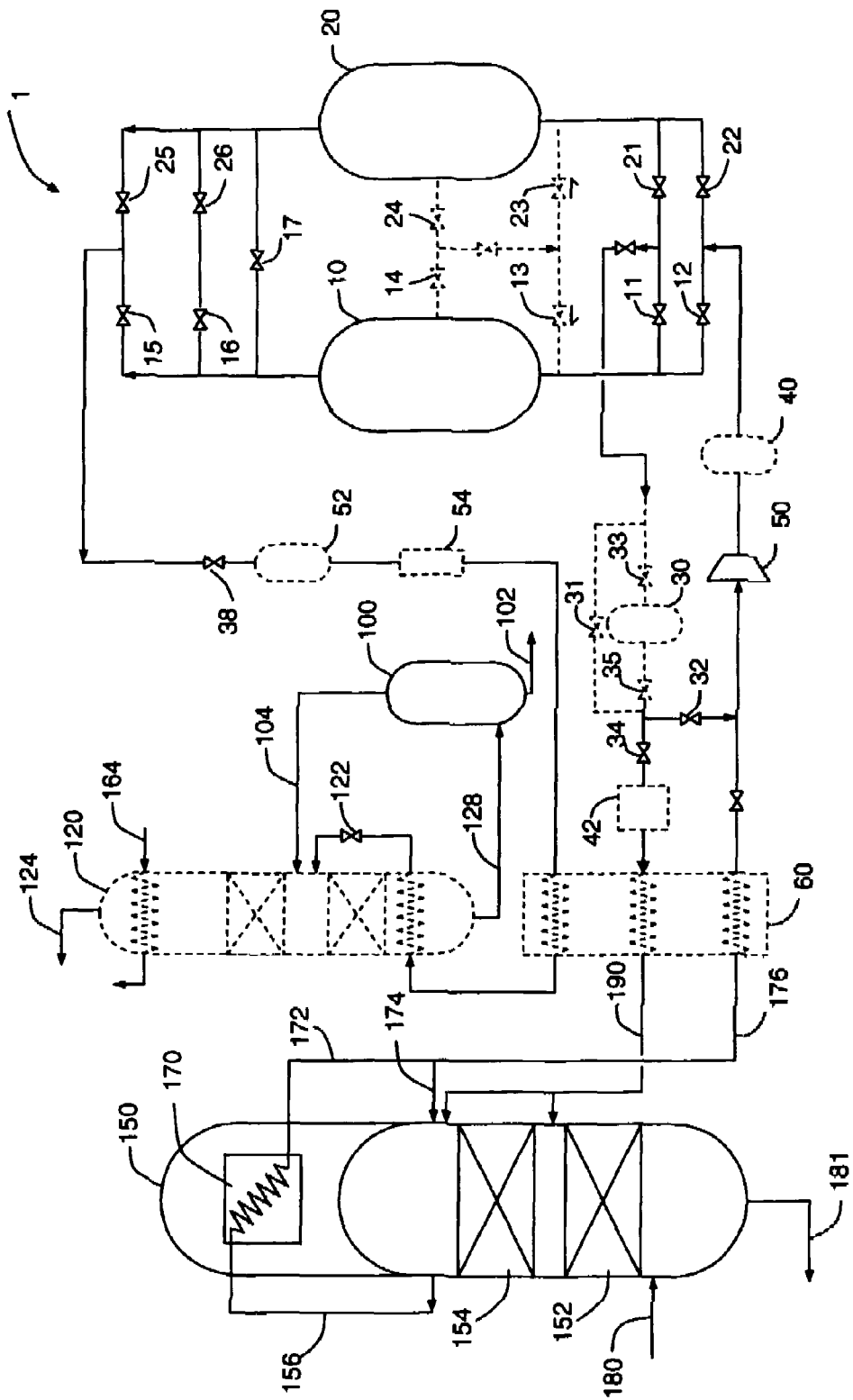
FIG. 1 shows a schematic of an apparatus according to the present invention.

The production of argon from a cryogenic air separation plant is known. Conventionally, the cryogenic air separation plant will have high and low pressure distillation columns and a crude argon column as described in U.S. Pat. No. 5,313,800 to Howard et al. In some cases the crude argon column may be incorporated within the low pressure column in a divided wall configuration as described in U.S. Pat. No. 6,240,744.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, The Continuous Distillation Process. The term, double column, is used to mean a higher pressure column having its upper portion in heat exchange relation with the lower portion of a lower pressure column.

Embodiments of the invention are shown with reference to FIG. 1, which illustrates an apparatus 1 for carrying out process steps of the invention. Equipment relating to cryogenic distillation may be constructed by means known in the art. Equipment relating to pressure swing adsorption may be constructed by means known in the art. Operating conditions known in the art, except as specifically noted, may be used for carrying out this invention.

An argon feed stream 180 from the low pressure column (not shown) is introduced to the crude argon column 150. The crude argon column may have multiple packed or trayed sections 152 and 154. Liquid 181 may be removed from the bottom of crude argon column 150 and introduced back to the low pressure column. A gas stream 156, which may comprise greater than 50 volume % argon, is withdrawn near the top of the column and at least partially condensed in condenser 170. Condenser 170 may be integrated within the crude argon column 150 or may be a separate vessel. A portion of the at least partially condensed stream 172 may be introduced back into crude argon column 150 as stream 174, whilst another portion 176 may be passed through an optional heat exchanger 60 and to a means for increasing pressure 50 thereby forming a compressed argon-containing fluid. The means for increasing pressure may be a compressor, blower, or other device known in the art, or an evaporator that increases pressure via liquid to gas expansion. The compressed argon-containing fluid may be passed to an optional surge vessel 40.

The compressed argon-containing fluid is passed to a pressure swing adsorption (PSA) system. The compressed argon-containing fluid may have a temperature between −20° C. and 50° C. and have a pressure between 30 psig and 130 psig. The pressure swing adsorption system comprises at least two pressure swing adsorption vessels 10 and 20, each containing one or more layers of adsorbents. One of the layers may comprise carbon molecular sieve (CMS). Carbon molecular sieve adsorbents operate based on a kinetic selectivity for oxygen compared to argon. The oxygen diffuses into the adsorbent faster than argon, allowing the argon to be purified. Adsorbents based on kinetic selectivity are distinct from adsorbents that operate on equilibrium (or thermodynamic) selectivity. Adsorbents that operate on equilibrium selectivity have a higher affinity for one component relative to other components in a gas mixture at equilibrium. In addition to a CMS adsorbent, the pressure swing adsorption vessel may contain a zeolite, either as a separate layer or mixed with the CMS, that has a thermodynamic selectivity for nitrogen relative to argon. The pressure swing adsorption system may operate by various cycle steps known in the art, especially the steps used in nitrogen PSA systems.

In a phase of the PSA cycle, compressed argon-containing fluid is introduced into a first end portion of pressure swing adsorption vessel 10 via open valve 12. While this compressed argon-containing fluid is being introduced, argon-rich gas, which may comprise greater than 90 volume % argon and less than 0.001 volume % oxygen, is withdrawn from a second end portion of the pressure swing adsorption vessel 10. Argon-rich gas may pass through product valve 15 and valve 38. At least a portion of the argon-rich gas may be passed through optional surge vessel 52, optional purifier 54, optional heat exchanger 60, optional distillation column 120, and then to an argon product storage vessel 100.

Optional purifier 54 may be any purifier known in the art for removing trace impurities, for example a getter-based purifier and/or a deoxo unit. Possible getter materials include transition metals, for example, copper, nickel, cobalt, iron, and manganese. U.S. Pat. No. 4,983,194 to Hopkins et al., discloses a getter system in combination with crude argon purification. Deoxo units remove oxygen by reacting hydrogen with oxygen impurities over a noble metal catalyst such as platinum, palladium and/or a transition metal catalyst such as nickel to form water which is removed in a dryer. U.S. Pat. No. 6,123,909 discloses a deoxo unit in combination with argon purification.

In at least one embodiment of the invention, optional distillation column 120 removes additional nitrogen before introducing the stream to the argon product storage vessel 100. Liquid nitrogen from another part of the cryogenic distillation process may be introduced via conduit 164 to the condenser section of distillation column 120. The condenser may be integrated within distillation column 120 or may be a separate vessel. A stream containing increased amounts of nitrogen may be rejected from the top of column 120 via conduit 124 and a stream with purified argon exits through conduit 128.

Argon product may be withdrawn from argon product storage vessel 100, as needed, via conduit 102. Boiloff from argon product storage vessel 100 may be passed to optional distillation column 120 via conduit 104.

As part of another phase of the PSA cycle, the introduction of the compressed argon-containing fluid into the pressure swing adsorption vessel 10 is terminated by closing valve 12.

As part of another phase of the PSA cycle, a depressurization gas is withdrawn from pressure swing adsorption vessel 10 via valve 11 and/or optional valve 14, thereby reducing the pressure in pressure swing adsorption vessel 10 to a final depressurization pressure. The final depressurization pressure in the pressure swing adsorption vessel 10 may be 0 psig to 20 psig.

During at least part of the step of withdrawing depressurization gas, argon-rich gas may be introduced via metering valve 17 into the second end portion of pressure swing adsorption vessel 10. Argon-rich gas may be provided from pressure swing adsorption vessel 20, optional surge vessel 52, or another pressure swing adsorption vessel in the case of more than two adsorption vessels.

In at least one embodiment of the invention, at least a portion of the depressurization gas is passed to a means for moderating flow, shown schematically as a flow control valve 32. Means for moderating flow may comprise at least one of a flow control valve, a gas capacitance means in combination with a downstream flow restriction, and a pressure control valve where the downstream pressure is controlled.

A flow control valve is defined herein as a device which can produce variable resistance to flow. The resistance of this device is varied in order to achieve a desired range of flow rates.

A flow restriction downstream of the gas capacitance means may be any type of valve, an orifice or the like.

A downstream pressure control valve is defined herein as a device which can produce variable resistance to flow. The resistance of this device is varied in order to achieve a desired range of pressures downstream of the pressure control valve.

In an embodiment of the invention, at least a portion of the depressurization gas is passed to a flow control valve 32, thereby regulating the flow of the depressurization gas and at least a portion of the regulated depressurization gas is introduced to a location upstream of the means for increasing pressure 50.

In another embodiment of the invention, at least a portion of the depressurization gas is passed to an optional gas capacitance means 30 and then to a flow control valve 32, thereby regulating the flow of the depressurization gas. At least a portion of the regulated depressurization gas is introduced to a location upstream of the means for increasing pressure 50. The optional gas capacitance means 30 may be a surge vessel and/or a volume of conduit. The optional gas capacitance means 30 may have a volume 0.5 to 20 times greater, or 2 to 10 times greater, than the volume of the pressure swing adsorption vessel 10.

In another embodiment of the invention, at least a portion of the depressurization gas is optionally passed through a filter (not shown) before being introduced to the means for increasing pressure 50.

In another embodiment of the invention, at least a portion of the depressurization gas is optionally passed to gas capacitance means 30 and subsequently flow control valve 34, thereby regulating the flow of the depressurization gas. The regulated depressurization gas may be optionally passed to optional filter 42 and heat exchanger 60 and then introduced into crude argon column 150. Optional filter 42 removes any particulates that may be in the stream from the adsorption vessels 10 and 20. The regulated depressurization gas may be introduced to one or more locations in crude argon column 150 as shown in FIG. 1.

In another embodiment of the invention, during a portion of the process cycle, at least a portion of the depressurization gas is passed to gas capacitance means 30 and at least of portion of the depressurization gas bypasses gas capacitance means 30 through valve 31. During this portion of the cycle, valve 35 is closed and valves 32 and/or 34 may be used to control the flow rate of the depressurization gas. During a subsequent portion of the process cycle, valve 33 is closes to prevent additional gas from entering gas capacitance means 30. Valves 32 and/or 34 continue to control the flow until a later portion of the cycle when flow control valve 35 opens to allow gas to exit gas capacitance means 30. This embodiment may provide a reduced bed pressure in the PSA.

According to an embodiment of the invention, to facilitate stability of the distillation process, the regulated depressurization gas, i.e. regulated by one or more of flow control valves 32 and 34, has a molar flow rate within 50% and 400% of the time-averaged molar flow rate of the regulated depressurization gas for at least 90% of the cycle time of the PSA cycle. Here the molar flow rate is defined as the molar flow rate immediately downstream of the means for moderating flow. The pressure swing adsorption vessels are subjected to repeated process operations, such as pressurization and depressurization, in a cyclical manner. The period of time required to complete one such cycle is referred to as the cycle time. In another embodiment of the invention, for at least 95% of the cycle time, the regulated depressurization gas has a molar flow rate within 66% and 200% of the time-averaged molar flow rate of the regulated depressurization gas. In another embodiment of the invention, for at least 95% of the cycle time, the regulated depressurization gas has a molar flow rate within 80% and 120% of the time-averaged molar flow rate of the regulated depressurization gas.

In an embodiment of the invention, the process comprises an equalization step. Equalization gas may be withdrawn from a middle portion of the pressure swing adsorption vessel 10, passed through valve 14 and check valve 23, and introduced into a first end portion of pressure swing adsorption vessel 20. Equalization gas may also be withdrawn from the second end portion of the pressure swing adsorption vessel 10, passed through valves 16 and 26, and introduced into a second end portion of pressure swing adsorption vessel 20.

As is typical of adsorption systems, at least one vessel is in a production phase while at least one other is in a regeneration phase, thereby allowing continuous production of product gas.

Therefore, in another phase of the PSA cycle, compressed argon-containing fluid is introduced into a first end portion of pressure swing adsorption vessel 20 via open valve 22. While this compressed argon-containing fluid is being introduced, argon-rich gas is withdrawn from the second end portion of the pressure swing adsorption vessel 20. Argon-rich gas may pass through product valve 25 and valve 38. At least a portion of the argon-rich gas may be passed through optional surge vessel 52, optional purifier 54, optional heat exchanger 60, optional distillation column 120, and then to an argon product storage vessel 100. Argon product may be withdrawn, as needed, via conduit 102.

As part of another phase of the PSA cycle, the introduction of the compressed argon-containing fluid into the pressure swing adsorption vessel 20 is terminated by closing valve 22.

As part of another phase of the PSA cycle, a depressurization gas is withdrawn from pressure swing adsorption vessel 20 via valve 21 and/or optional valve 24, thereby reducing the pressure in pressure swing adsorption vessel 20 to a final depressurization pressure. The final depressurization pressure in the pressure swing adsorption vessel 20 may be 0 psig to 20 psig.

During at least a portion of the step of withdrawing depressurization gas, argon-rich gas may be introduced via metering valve 17 into the second end portion of pressure swing adsorption vessel 20. Argon-rich gas may be provided from pressure swing adsorption vessel 10, optional surge vessel 52, or another pressure swing adsorption vessel in the case of more than two adsorption vessels.

The depressurization gas exiting adsorption vessel 20 may flow through means for moderating flow and optional filter 42 in the same manner as the depressurization gas which exited adsorption vessel 10.

In an embodiment of the invention which comprises an equalization step, equalization gas may be withdrawn from a middle portion of the pressure swing adsorption vessel 20, passed through valve 24 and check valve 13, and introduced into a first end portion of pressure swing adsorption vessel 10. Equalization gas may also be withdrawn from the second end portion of the pressure swing adsorption vessel 20, passed through valve 16 and valve 26, and introduced into a second end portion of pressure swing adsorption vessel 10.

EXAMPLE

As discussed above, there is a threshold flow rate of the feed stream from the low pressure column where, above this threshold flow rate, detrimental quantities of nitrogen are passed to the argon column. In practice, the system may be operated close to this threshold flow rate as long as the flows throughout the system are steady. To study the effect, a cryogenic distillation column system was modeled by a dynamic simulation computer program. The system comprised a low pressure column and an attached crude argon column.

In Case 1, representing operation using a means for moderating flow with perfect flow control, the recycle flow to the crude argon column (stream 190 in FIG. 1) was maintained at a steady rate, R. In Case 2, representing operation using a means for moderating flow with moderate flow control, the recycle flow to the crude argon column was maintained at 66% of R for most of the period and 200% of R only briefly, but still having a time-averaged rate of R. In Case 3, representing operation under the natural behavior of uncontrolled recycle flow with no means for moderating flow, the recycle flow to the crude argon column was maintained at 70% of R for most of the period, briefly at 200% of R, and briefly at zero flow, but still having a time-averaged rate of R.

In Case 1, the system may operate at or near the threshold flow rate thereby providing the theoretical maximum argon recovery. For this case, the initial composition of nitrogen in stream 180 was 1.5 ppm. Because there is no disturbance, the dynamic simulation calculation shows that the composition of nitrogen in stream 180 was 1.5 ppm. In Case 2, for an initial concentration of 1.5 ppm of nitrogen, the dynamic simulation calculation shows that the composition of nitrogen in stream 180 grows to over 300 ppm nitrogen. To correct the situation the initial concentration of nitrogen needs to be reduced to 0.15 ppm. To achieve this for Case 2, the flow rate to the crude argon column was decreased.

Similarly, for Case 3 the dynamic simulation calculation shows that the initial concentration of nitrogen needs to be reduced to 0.005 ppm to prevent the nitrogen concentration from growing to unacceptable levels. To achieve this for Case 3, the flow rate to the crude argon column was decreased again.

To summarize, the dynamic simulation demonstrates that the concentration of nitrogen in stream 180 has to be reduced by 1 to 2 orders of magnitude, depending on the degree of flow variability.

Steady state simulations based on the limitation of reducing the concentration of argon by 1 order of magnitude for Case 2, and 2 orders of magnitude for Case 3 demonstrate the impact on power consumption of the entire facility. These simulations show that the system would need to process about 0.4% to 1.5% more feed air for Case 2 relative to Case 1. The variability in the feed air flow penalty is related to the initial stage count in the distillation section in the low pressure column above the point where the crude argon column feed is withdrawn. The system consumes more power to process more feed air. The power penalty for Case 2 relative to Case 1 is calculated to be 0.3% to 1.5%.

Similarly, in Case 3, the system would need to process about 1.0% to 5.9% more feed air to make up the lost argon production for Case 3 relative to Case 1. The power penalty for Case 3 relative to Case 1 is calculated to be 1% to 5.9%.

The results of the two sets of simulations show that regulating the flow of the depressurization gas by a means for moderating flow improves the process efficiency relative to processes without the means for moderating flow. As the means for moderating flow provides less flow variability, the process efficiency may be improved.

The present invention has been set forth with regard to several preferred embodiments. However, the scope of the present invention should be ascertained from the claims that follow.

We claim:

1. A method for producing argon product comprising:
withdrawing an argon-containing fluid from a first cryogenic distillation column;
increasing the pressure of at least a portion of the argon-containing fluid in a means for increasing pressure thereby forming a compressed argon-containing fluid;
introducing at least a portion of the compressed argon-containing fluid into a first end portion of a first pressure swing adsorption vessel;
withdrawing a first argon-rich gas from a second end portion of the first pressure swing adsorption vessel;
terminating the introduction of the compressed argon-containing fluid into the first pressure swing adsorption vessel;
withdrawing a depressurization gas from at least one of the first end portion and a middle portion of the first pressure swing adsorption vessel thereby reducing the pressure in the first pressure swing adsorption vessel to a final depressurization pressure;
regulating the flow of at least a portion of the depressurization gas by passing the at least a portion of the depressurization gas to a means for moderating flow thereby forming a regulated depressurization gas; and
introducing at least a portion of the regulated depressurization gas into at least one of the first cryogenic distillation column and the means for increasing pressure.

2. The method of claim 1 wherein, for at least 90% of a cycle time of the first pressure swing adsorption vessel, the at least a portion of the regulated depressurization gas has a molar flow rate within 50% and 400% of the time-averaged molar flow rate of the at least a portion of the regulated depressurization gas.

3. The method of claim 1 wherein the means for moderating flow comprises a gas capacitance means and a downstream flow restriction.

4. The method of claim 3 wherein the gas capacitance means has a volume 0.5 to 20 times greater than the volume of the first pressure swing adsorption vessel.

5. The method of claim 1 wherein the compressed argon-containing fluid comprises oxygen, the method further comprising kinetically adsorbing the oxygen in the first pressure swing adsorption vessel using carbon molecular sieve.

6. The method of claim 1 further comprising:
withdrawing a first equalization gas from the middle portion of the first pressure swing adsorption vessel;
introducing at least a portion of the first equalization gas into a first end portion of a second pressure swing adsorption vessel;

withdrawing a second equalization gas from the second end portion of the first pressure swing adsorption vessel; and introducing at least a portion of the second equalization gas into a second end portion of the second pressure swing adsorption vessel.

7. The method of claim 1 wherein the argon-containing fluid comprises greater than 50 volume % argon.

8. The method of claim 1 wherein the first argon-rich gas comprises greater than 90 volume % argon.

9. The method of claim 1 wherein the first argon-rich gas comprises less than 0.001 volume % oxygen.

10. The method of claim 1 wherein the final depressurization pressure is 0 psig to 20 psig.

11. The method of claim 1 further comprising:
introducing a second argon-rich gas from at least one of the second pressure swing adsorption vessel and a third pressure swing adsorption vessel into the second end portion of the first pressure swing adsorption vessel during at least a portion of the step of withdrawing the depressurization gas.

12. The method of claim 1 further comprising:
filtering at least one of the at least a portion of the depressurization gas and the at least a portion of the regulated depressurization gas.

13. The method of claim 1 further comprising:
introducing at least a portion of the first argon-rich gas into a second cryogenic distillation column.

14. The method of claim 1 further comprising:
introducing at least a portion of the first argon-rich gas into a purifier vessel containing a getter.

15. An apparatus for producing argon product comprising:
a first distillation column having an inlet and an outlet, the outlet for withdrawing an argon-containing fluid;
a means for increasing pressure of the argon-containing fluid having an inlet and an outlet, the inlet in fluid communication with the first distillation column outlet;
a first pressure swing adsorption vessel having a first end portion, a middle portion, and a second end portion, the first end portion in selective fluid communication with the outlet of the means for increasing pressure;
a second pressure swing adsorption vessel having a first end portion, a middle portion, and a second end portion, the first end portion of the second pressure swing adsorption vessel in selective fluid communication with the outlet of the means for increasing pressure; and
a means for moderating flow having an inlet and an outlet, the inlet of the means for moderating flow in selective fluid communication with the first end portion of the first pressure swing adsorption vessel and in selective fluid communication with the first end portion of the second pressure swing adsorption vessel, the outlet of the means for moderating flow in fluid communication with at least one of the inlet of the first distillation column and the inlet of the means for increasing pressure.

16. The apparatus of claim 15 wherein:
the means for moderating flow comprises a gas capacitance means and a downstream flow restriction.

17. The apparatus of claim 16 wherein the downstream flow restriction comprises at least one flow control valve.

18. The apparatus of claim 16 wherein the gas capacitance means has a volume 0.5 to 20 times greater than the volume of the first pressure swing adsorption vessel.

19. The apparatus of claim 15 wherein the first pressure swing adsorption vessel and the second pressure swing adsorption vessel contain carbon molecular sieve.

20. The apparatus of claim 15 wherein the middle portion of the first pressure swing adsorption vessel is in selective fluid communication with the first end portion of the second pressure swing adsorption vessel and wherein the second end portion of the first pressure swing adsorption vessel is in selective fluid communication with the second end portion of the second pressure swing adsorption vessel.

21. The apparatus of claim 15 further comprising:
a particulate filter having an inlet and an outlet, the inlet of the particulate filter in fluid communication with the outlet of the means for moderating flow, the outlet in fluid communication with the inlet of the first distillation column.

22. The apparatus of claim 15 further comprising:
a second distillation column having an inlet and an outlet, the inlet of the second distillation column in selective fluid communication with the second end of the first pressure swing adsorption vessel and in selective fluid communication with the second end of the second pressure swing adsorption vessel.

23. The apparatus of claim 22 further comprising:
a purifier vessel containing a getter, the purifier vessel having an inlet and an outlet, the purifier vessel inlet in selective fluid communication with the second end portion of the first pressure swing adsorption vessel, the purifier outlet in fluid communication with the inlet of the second distillation column.

24. The method of claim 1 wherein, for at least 95% of a cycle time of the first pressure swing adsorption vessel, the at least a portion of the regulated depressurization gas has a molar flow rate within 66% and 200% of the time-averaged molar flow rate of the at least a portion of the regulated depressurization gas.

25. The method of claim 1 wherein, for at least 95% of a cycle time of the first pressure swing adsorption vessel, the at least a portion of the regulated depressurization gas has a molar flow rate within 80% and 120% of the time-averaged molar flow rate of the at least a portion of the regulated depressurization gas.

* * * * *